Figure 1:
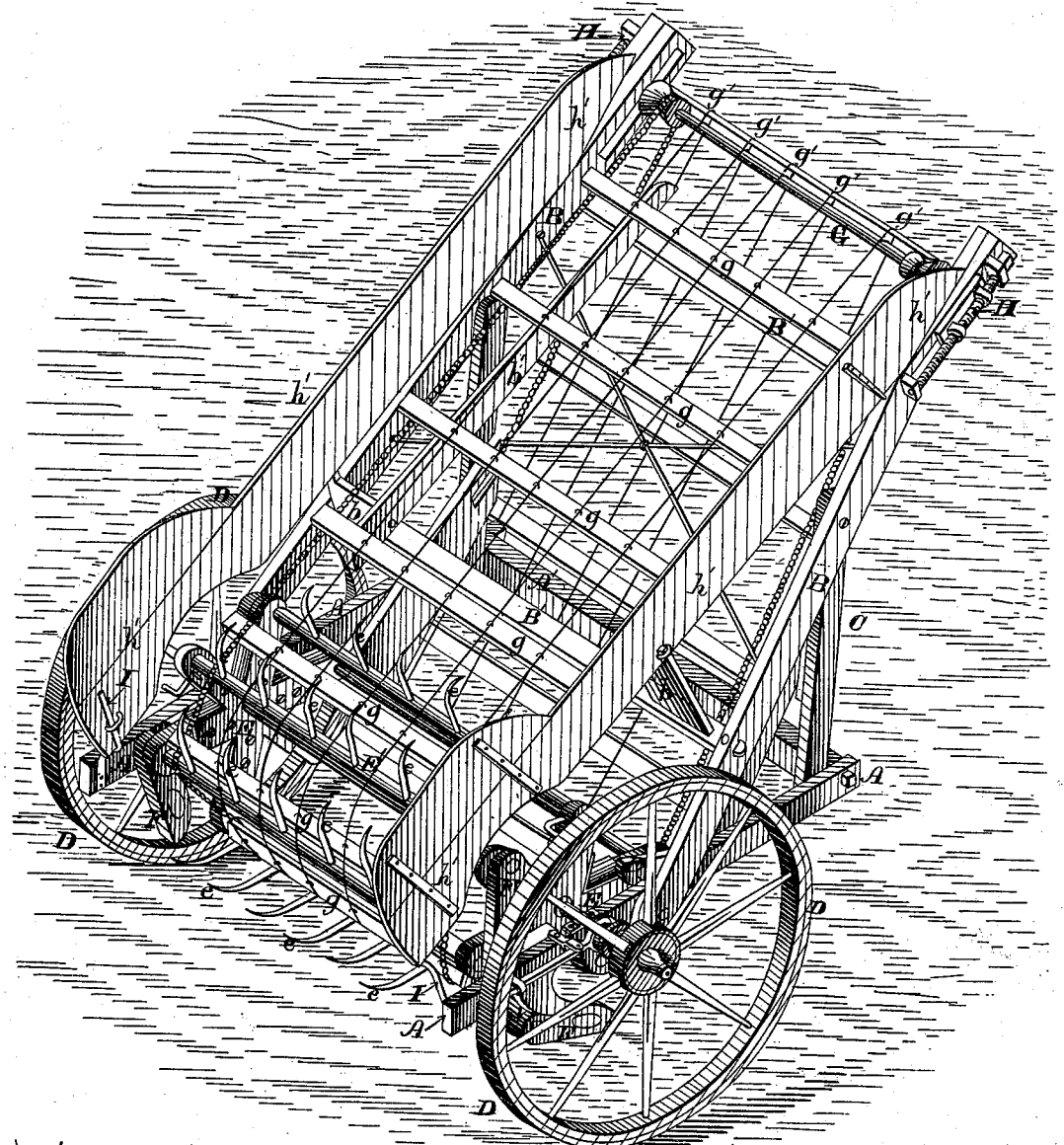

J. W. & E. SMALL.
HAY-LOADER.

No. 177,893. Patented May 23, 1876.

3 Sheets—Sheet 2.
J. W. & E. SMALL.
HAY-LOADER.
No. 177,893. Patented May 23, 1876.
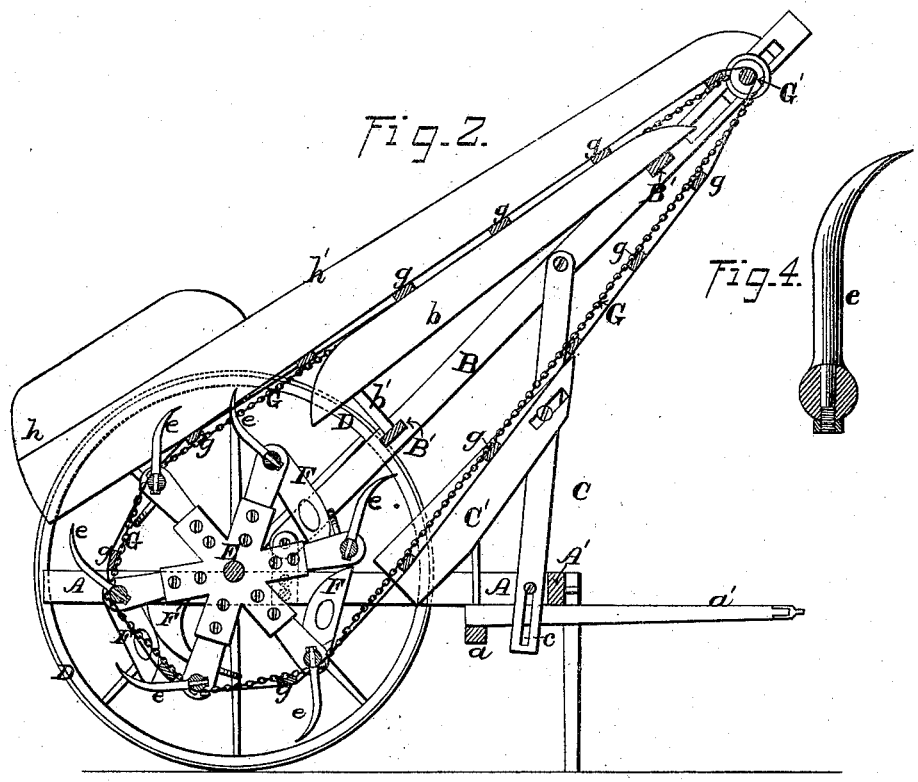
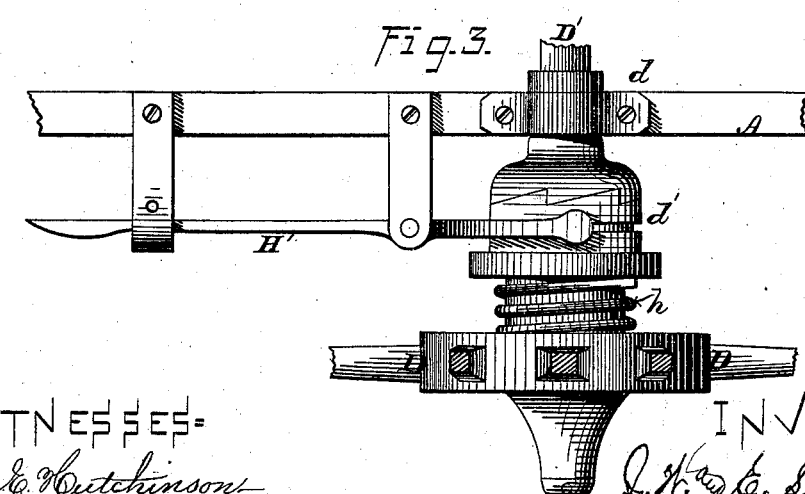
Witnesses:
Jas. E. Hutchinson
John R. Young
Inventors:
J. W. & E. Small, by
Prindle & Co., their Atty

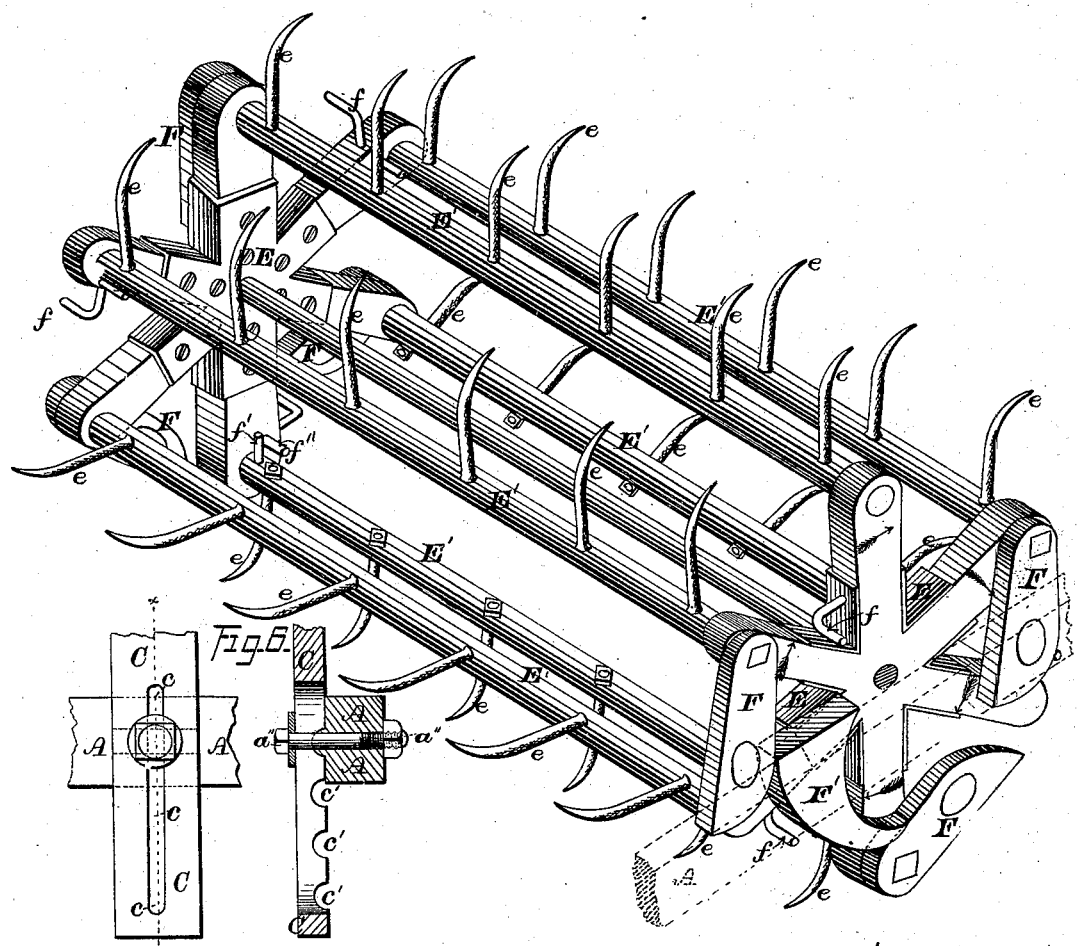

UNITED STATES PATENT OFFICE.

JAMES W. SMALL AND EDWARD SMALL, OF AURORA, ILLINOIS.

IMPROVEMENT IN HAY-LOADERS.

Specification forming part of Letters Patent No. 177,893, dated May 23, 1876; application filed November 8, 1875.

*To all whom it may concern:*

Be it known that we, JAMES W. SMALL and EDWARD SMALL, of Aurora, in the county of Kane, and in the State of Illinois, have invented certain new and useful Improvements in Hay-Loading Machines; and do hereby declare that the following is a full, clear, and exact description thereof, reference being had to the accompanying drawings, making a part of this specification, in which—

Figure 1 is a perspective view of our improved hay-loading machine ready for use, except that it is not attached to a wagon. Fig. 2 is a vertical central section upon the line of draft. Fig. 3 is a plan view of a portion of the main or principal frame, showing the means by which the same is suspended to the axle, the clutch and lever for operating the same, the coil spring, and hub of wheel. Fig. 4 is an enlarged view of a tooth of the revolving rake, with a section of the arm, showing the method of fastening the former to the latter. Fig. 5 is a perspective view of the revolving rake, showing the drum and attachments for operating the same; and Fig. 6 is an enlarged side elevation and cross-section of the side rails of the main or principal frame and stands, showing the means employed for rendering the carrier-frame vertically adjustable to suit the height of the load, and for securing the same in position.

Letters of like name and kind refer to like parts in each of the figures.

The object of our invention is the production of a machine that shall enable the farmer to complete the process of haying with machinery by taking the hay from the ground after it has been cured and loading it upon a wagon; and it consists, principally, in the means employed for tripping the revolving rake-heads, substantially as and for the purpose hereinafter shown and described. It consists, further, in the means employed for adjusting the carrier-frame, and securing the same in position, substantially as and for the purpose hereinafter shown and set forth. It consists, further, in the manner of constructing and arranging the wheel-hub and clutch, substantially as and for the purpose hereinafter shown and described. It consists, further, in the construction and arrangement of the supporting-guides for the carrier, substantially as and for the purpose hereinafter shown and described. It consists, further, in the construction and arrangement of the frames, and their combination with each other, substantially as and for the purpose hereinafter shown, described, and set forth; and it consists, finally, in the manner of constructing the shanks of the rake-teeth, substantially as and for the purpose hereinafter shown and described.

In the annexed drawings, A and A represent the side rails of the main or principal frame, which is preferably constructed of wood. They are connected at their forward ends with a cross-bar, A', by being framed together in the usual manner. For the purpose of giving additional strength to the frame a second cross-bar, $a$, is provided and placed under the side rails and to the rear of cross-bar A', as shown in Fig. 2, and the same is firmly secured in position by being bolted to the side rails A and A. The tongue $a'$ is framed into the cross-bar $a$, and is bolted to the under side of the cross-bar A', leaving the braces of the same to be applied as may be desired. The side rails B and B of the carrier-frame are pivoted to short upright stands, for the purpose of enabling the carrier to be adjusted vertically, and said stands are fastened to and secured upon the main frame by means of bolts and nuts in the manner indicated by dotted lines in Fig. 2.

The advantage of thus pivoting the side rails B B to the main or principal frame is that in case of repairs the entire carrier-frame can be more easily removed than where the same is pivoted to and upon the axle, and it also enables the hub of the wheel to be made longer, and, consequently, gives the same an increased bearing and wearing surface upon the axle. The side rails B and B are connected together by means of two cross-bars, B' and B', framed and pinned in the usual manner. Near the outer ends of the rear cross-bar B' are provided two stands, $b$ and $b$, that are framed into and secured upon the upper side of the former, and furnish a support for the rear end of the upper carrier-guides $b'$ and $b'$, said guides being secured in position at their forward ends by doweling the same to the cross-bar B', and at their rear ends by screwing them fast to the stands b and b. The forward end of the carrier-frame is supported and rendered adjustable by means of stands C and C, the lower ends of which are slotted vertically, and notched horizontally, to correspond with blocks or ledges that are fastened to and secured upon the side rails A and A near their forward ends, and in line horizontally with the same, and a bolt passing through the slot of the stand C and side rail A secures the former to the latter, as shown in the enlarged view, Fig. 6. Said supports are pivoted at their upper ends to the side rails B and B of the carrier-frame, as shown in Fig. 3.

The advantage of pivoting the stands C C at their upper ends, and arranging the adjusting device at their lower ends, is that, as the load of hay increases in height, and it becomes necessary to raise the forward end of the carrier-frame, the operator is enabled to do it standing upon the ground, instead of climbing a ladder, as he must do in case the said stands are pivoted at their lower ends, and the adjusting device is placed at their upper ends.

The lower carrier-guides C' and C' are provided at their rear ends with pivoted dowel-pins, the lower ends of which latter are fitted loosely to holes provided for the purpose in cross-bar a. Said guides are slotted at their upper ends, and are secured to the stands b and b by bolting the former to the latter through the slots, and thus rendering the former adjustable. Two wheels, D and D, are constructed in the ordinary manner, except the hubs, which are preferably made of cast-iron, the projecting portions of which, upon the inside of the wheels, are turned round and parallel, and thus provide bearings for the movable parts of the clutches d' and d'.

It will be observed that by this arrangement the hubs of said wheels are enabled to be made very much longer, rendering the wheel more steady, without in any manner lessening the room required for the clutches, or increasing the distance between the wheels, neither is it necessary to contract the framing.

The axle D' is preferably constructed of wrought-iron. The wheels D and D are journaled upon the same, and are secured in position by means of linchpins provided in the usual manner.

The side rails A and A of the main frame are suspended under the axle D, and are secured in position by means of two journal-box caps, d and d, preferably made of cast-iron, placed over and partially encircling the axle, and are firmly bolted to the said side rails, and by this arrangement all of the framing, as well as all of the machinery, is suspended to and upon the axle between the wheels. The great advantages possessed by thus arranging the framing and machinery between the wheels will, it is believed, be apparent, as the operator is enabled to remove the wheels or clutches for the purpose of oiling or repairs without removing any portion of the framing, which latter must, of course, be done in all cases where the whole or any portion of the framing or machinery is attached to the axle outside of the wheels.

Two cast-iron flanges, E and E, are provided with radial arms, and are firmly secured to and upon the axle D', adjacent to and between the side rails A and A, and as thus arranged serve as a means for operating the revolving rakes E' and E'. Near the outer ends of said wooden arms holes are provided in the same, through and into which the arms or shafts of the rakes E' and E' are loosely fitted, and by this means the latter are enabled to revolve. The curved rake-teeth e and e are fastened to, and secured upon, the arms or shafts E' and E' by means of threaded screws and nuts cut upon the shanks of the former, as shown in enlarged views, Figs. 4 and 5.

The means employed to time the operation of the rakes and secure their proper position consists in the trips F and F, which are firmly fastened to the projecting ends of the arms or shafts E' and E', alternately upon either end, and the tripping-blocks F' and F', which are fastened to and secured upon the inner side of the side rails A and A, as shown in enlarged view, Fig. 5. Angle-irons $f$ and $f$ are provided and secured to the wooden arms of the flanges E and E, for the purpose of insuring the correct position of the rakes e and e after the trips F and F have passed the point of contact with the tripping-blocks F' and F'.

To insure the complete operation of the rakes, it has been found necessary to add to the weight of the trips F and F, near their outer ends, and this is preferably accomplished by cutting away a portion of the wood, and filling the opening thus made with lead; and as such increased weight would have a tendency to cause the trips F and F, and consequently the rake-teeth e and e, to assume a vertical position before the former could come in contact with the tripping-blocks F' and F', and in order to prevent movement, a pin, $f'$, is secured within one end of each rake-head or shaft E', and extending radially outward from a point directly opposite to the teeth e and e, engages with a pin, $f''$, that is secured within the inner face of the contiguous arm E, and extends horizontally inward from a point slightly in rear of the pivotal bearing of said rake-head between the same and the axle D'. If, now, the rake-heads incline to rotate too far in the direction named, the pins $f'$ and $f''$ will operate as stops, and prevent the derangement which would otherwise result.

The trips F F increase in width from the shaft outward to the end, and upon the forward edge, and near the outer end, they are cut away upon a gradual curve that ends at the rear corner, as shown in Fig. 5.

The tripping-blocks F' F' are constructed in the form of a curved wedge, and incline downward and forward. The peculiar shape given to said trips and tripping-blocks has been found necessary, for the purpose of securing the correct position of the rakes at the time the greatest strain is put upon them from the time they first come in contact with the hay upon the ground until the former is thrown upon the carrier, and their operation is as follows, viz: The rakes revolve in the direction indicated by the arrows upon the radial arms in Fig. 5. Very soon after the rake has passed over the upper center the hay is thrown upon the carrier, and the teeth, occupying nearly a vertical position, drop below the carrier-bands. At the time that this particular rake is nearly upon the forward quarter of the circle that is described by the revolving rakes the trip is arrested by one of the angle-irons $f f$, and is carried around until the point of the curved portion of the former is brought in contact with, and impinges upon, the point of the tripping-block on the forward side, and as the rake-drum continues to revolve the trip slides upward upon the concave edge of the tripping-block until the point of the latter has approached sufficiently near the center or shaft of the former to cause the same to perform half a revolution instantly, bringing the rake-teeth at once in contact with the hay upon the ground, and at the same time changing the point of contact of the trip and tripping-block by causing the curved surface of the former to impinge upon the rearward or convex surface of the latter, and as the drum continues to revolve the rake-teeth are, by the means above described, maintained in a radial position until they have performed their office of gathering the hay from the ground and depositing it upon the carrier.

The carrier consists of two endless chains, G and G, passing over and partially around the arms or shafts of the revolving rakes at the rear end of the machine, and over the carrier-roller G' at the forward end of the carrier-frame. Cross-bars $g$ and $g$ extend transversely from one chain to the other, and the former are secured to and upon the latter by means of staples, that are caused to pass through the links of the chains and cross-bars, and are clinched upon the outer side of the latter. Small endless ropes $g'$ and $g'$ are passed over and partially around the arms or shafts of the revolving rakes and carrier-roller, in line with the endless chains G and G, and said ropes are secured upon, and fastened to, the cross-bars $g$ and $g$ by means of staples driven into, and clinched upon, the inside of the former, thus completing the carrier.

Provision is made for tightening the carrier and adjusting the tension of the same by means of movable journal-boxes and screws H and H, that are secured to and upon the outer sides and forward ends of side rails B and B, and enable the operator to give the carrier any tension required.

In order to render said movable journal-boxes and screws free from the objections that are urged against devices constructed for similar purposes, they are constructed and arranged as follows, viz: Upon each side rail of the carrier-frame are fastened and secured two angle-irons, one at each end of the groove within which the journal-box slides. To render the journal-boxes steady and secure, the part that fits into the groove of the side rail is made long, and upon the outer side, and near the ends, two lugs are cast solid with each box, and these are tapped out to fit the adjusting-screw, said screw having a bearing at each end in the angle-irons provided at each end of the grooves of the side rails. Each screw is provided at the upper end with a head, and can be turned with an ordinary wrench.

Upon each side of the carrier, and in line with the endless chains, are provided two side boards, $h'$ and $h'$, for the purpose of preventing the hay from falling off the carrier to the ground while being conveyed to the wagon. They are secured to the side rails B and B at their forward ends by means of dowel-pins, and rest upon, and are secured to, the stands $b$ and $b$ by means of staples, as shown in Fig. 1. At their rear ends they are secured in position by means of wrought-iron stands I and I, that are pivoted to the side rails A and A. At a point corresponding with said pivoted stands staples are provided, and secured to said side boards by being driven into the same and clinched, and the former are fitted to encircle said stands I and I loosely. Said side boards are provided at their rear ends with a vertical enlargement, which experience has shown to be necessary, for the purpose of preventing the hay from falling off when first taken up by the rakes.

Two clutches, $d'$ and $d'$, are provided, and secured in position between the wheels D and D and side rails A and A, the movable parts of which are furnished with a bearing upon the projecting portions of the hubs of wheels D and D. They are fitted to said hubs with a spline and feather, in the usual manner, and are enabled to be moved to or from the face of the hub by means of the lever H', and are caused to revolve with the wheels D and D. The immovable parts of clutches $d'$ and $d'$ are firmly keyed to the axle D', and revolve with the same.

For the purpose of taking up any lost motion that might exist between the wheels and movable parts of the clutches, coil-springs $h$ and $h$ are provided, and arranged as shown in Fig. 3, enlarged view. They are caused to encircle the inside projecting portion of the hubs of wheels D and D, and exert an equal pressure upon said hubs and the movable parts of clutches $d'$ and $d'$.

It is believed that the advantages afforded by this construction and arrangement of the wheel-hub and clutch render it superior to any now in use, from the fact that it admits of a far greater length of wheel-hub, and, while the clutch is easily operated, it, as well as the wheel, can readily be removed, when necessary, without in any manner disturbing the framing or other parts of the machine.

As thus constructed the machine is complete, and is operated as follows: It is attached by the tongue to the rear end of the wagon upon which the hay is to be loaded, the clutches thrown out of gear, and fastened in this position by means of pins that secure the clutch-levers within their guards. It is now ready to be drawn to the field, and it will be observed that while going to or from the field with the clutches thrown out of gear the raking portion of the machine is at rest. The hay to be loaded is raked into windrows, and the horses, wagon, and hay-loading machine are driven astride the same. The clutches are thrown into gear, thus connecting the raking machinery with the wheels, and the horses started. Motion is at once transmitted from the wheels to the raking machinery; the hay is gathered from the windrows by the rakes and conveyed to the carrier, by which it is carried to, and deposited upon, the wagon. As the load increases in height, the carrier-frame is raised at its forward end by means of the adjustable stands of the carrier-frame. As many men as can conveniently work upon the wagon are required to stow away the hay as fast as it is brought up by the carrier. Should it be necessary to turn the machine around, or to back up, the clutches should be thrown out of gear, in order to prevent any accident to the raking machinery. The same care should be observed in going to or returning from the field.

By the use of our improved machine the farmer is enabled to secure a greater amount of hay with a given amount of labor than he could possibly do otherwise; and the labor, and consequently the cost of gathering it is reduced to the minimum.

Having thus fully set forth the nature and merits of our invention, what we claim as new is—

1. The means employed for giving to the rake-heads E' and E' a variable rotary motion, so as to cause the teeth $e$ and $e$ to engage with, raise, and then release, the hay, consisting of the trips F and F, secured upon, and extending radially outward from, the journals of said heads, and having the forward edge of each formed upon a curved line from a point near its outer end to the intersection of said end with the opposite straight edge; the tripping-blocks F' and F', constructed in the form of a curved wedge, and secured upon the main frame, so as to engage with the curved front edges of said trips; the angle-irons $f$ and $f$, secured upon the rear side of each alternate arm E, and extending rearward and outward, so as to limit the forward motion of said trips; and the pins $f'$ and $f'$, which are secured within, and project radially inward from, each of said rake-heads, and engage with fixed pins $f''$ and $f''$, that project horizontally inward from the arms E and E, said parts being constructed and combined to operate in the order and for the purpose specified.

2. In combination with the side rails B B of the carrier-frame, which are pivoted at their ends to or upon the main frame, the stands C C, each pivoted at its upper end to said side rails, provided at its lower end with a longitudinal slot, $c$, and a series of transverse semicircular grooves, $c'$ $c'$, that are caused to engage with a ledge, corresponding with said grooves, upon the inner face of the rails A A, and firmly secured in position by a screw-bolt, $a'$, by means of which said carrier-frame may be raised or lowered by a person standing upon the ground, substantially as and for the purpose shown and set forth.

3. In combination with the clutches $d'$ $d'$ and coil-springs $h$ $h$, as arranged, the inner projecting portions of the hubs of the wheels D D, to and upon which the movable portions of the said clutches are fitted, said projecting portions of the hubs providing a bearing for said movable parts of the clutches, in the manner and for the purpose substantially as shown and described.

4. In combination with the side rails B B and stands C C, the carrier-guides C' C', slotted at their forward ends, and secured to the stands C C by means of a bolt and nut, and supported at their rear ends by means of a vertical dowel-pin or stand, the lower end of which latter is fitted loosely to a hole provided in cross-bar $a'$, while the upper end of said dowel-pin or stand is pivoted to the rear end of said carrier-guides C' C', in the manner and for the purpose substantially as shown and set forth.

5. In combination with the side rails B B, the side boards $h'$ $h'$, extending from the forward end of the former to the rear end of the revolving rakes, and upon each side of the carrier $g$ $g$, and provided at their rear ends with an enlargement, in the manner and for the purpose substantially as shown and described.

In testimony that we claim the foregoing we have hereunto set our hands this 28th day October, 1875.

JAMES W. SMALL.
EDWARD SMALL.

Witnesses:
J. DENNEY, Jr.,
L. TITSWORTH, Jr.